United States Patent [19]
Fromme

[11] 4,079,492
[45] Mar. 21, 1978

[54] METHOD OF MAKING BEARING PULLEY

[75] Inventor: Hans-Georg Fromme, Stuttgart, Germany

[73] Assignee: R. Stahl Aufzuge GmbH, Stuttgart, Germany

[21] Appl. No.: 667,839

[22] Filed: Mar. 17, 1976

[30] Foreign Application Priority Data

Mar. 22, 1975 Germany .............................. 2512843

[51] Int. Cl.² .............................................. B21K 1/42
[52] U.S. Cl. ........................... 29/159 R; 29/148.4 D; 29/115; 29/123; 72/367; 74/230.8; 113/116 D; 228/155
[58] Field of Search ........ 29/DIG. 3, 159 R, 148.4 R, 29/148.4 D, 115, 123, 110; 113/116 D, 116 R, 116 N, 1 M; 308/15, 18, 20; 72/367; 74/230.8; 228/155

[56] References Cited
U.S. PATENT DOCUMENTS

| | | | |
|---|---|---|---|
| 1,598,240 | 8/1926 | Carlson | 72/367 X |
| 1,748,473 | 2/1930 | Fisk | 29/123 |
| 1,984,115 | 12/1934 | Cooper | 29/148.4 D X |
| 1,990,805 | 2/1935 | Watson et al. | 74/230.8 UX |
| 1,990,806 | 2/1935 | Watson et al. | 308/20 X |
| 2,208,729 | 7/1940 | Offutt | 29/115 X |
| 2,671,348 | 3/1954 | Moore | 29/159 R X |
| 3,984,160 | 10/1976 | Sheldon | 308/18 X |

*Primary Examiner*—Victor A. DiPalma
*Attorney, Agent, or Firm*—Shlesinger, Arkwright, Garvey and Dinsmore

[57] ABSTRACT

A method of producing bearing pulleys for conveyer belts and roller gravity conveyers in which the bearing pulley includes a cylindrical portion and common central pivot pins secured to the cylindrical portion by a hub or roller base, which comprises providing a cylindrical pipe of a desired bearing pulley diameter, tapering the end portions of said pipe in a truncated configuration by non-cutting cold deformation down to the diameter of the pivot pins, and subsequently inverting the tapered end portions of the pipe centrally within the cylindrical portion of the pipe a distance sufficient to provide the desired spacing between the ends of the pulley.

8 Claims, 5 Drawing Figures

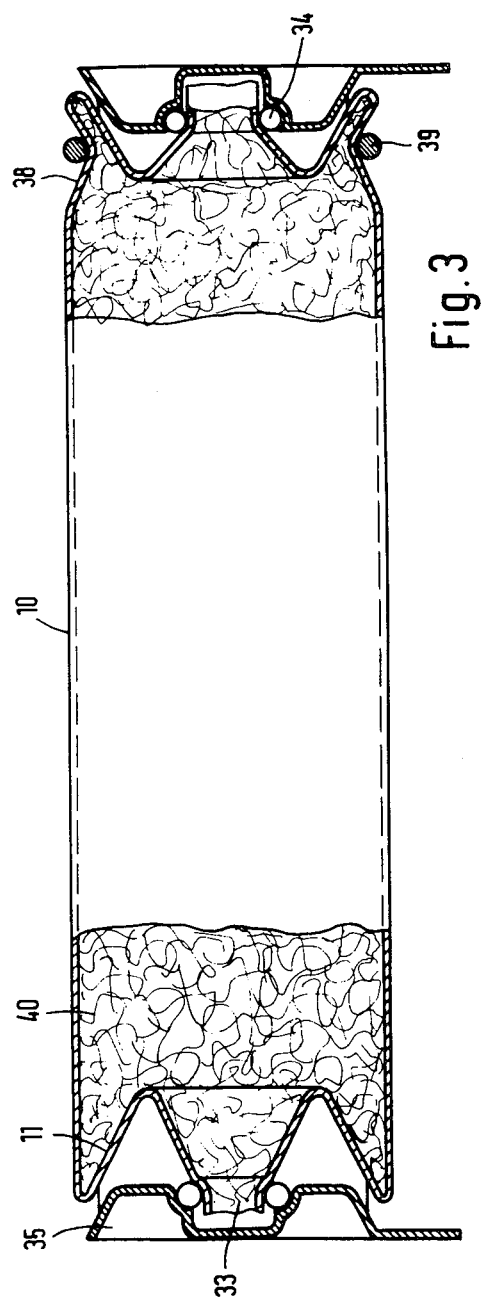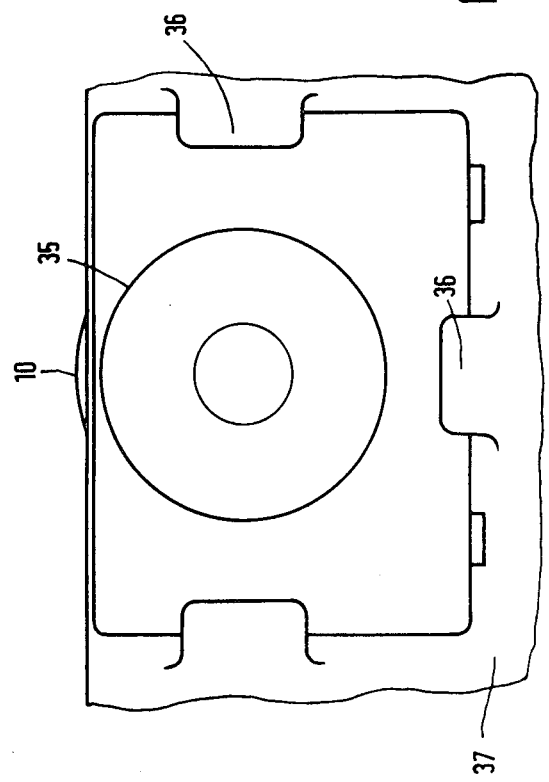

METHOD OF MAKING BEARING PULLEY

The present invention concerns bearing pulleys for roller conveyers which rotate either freely or are driven in order to convey goods to be transported along a specified course from a feeding point to a destination. Such pulleys are also used as drums or guide pulleys for continuous conveyer belts, whereby such belts can be supported between their ends by bearing pulleys of the same type.

Known bearing pulleys consist of a metal cylindrical pipe, whose ends are closed by hubs which bear concentrically on a shaft butt or pivot which runs in a roller bearing situated in the side walls of the course.

In many constructions these hubs or bases of the bearing pulleys consist of sheet metal pieces reinforced through bending deformation which are joined with the pulley cylinder pipe by flanging or welding.

Hubs are known for use in gravity roller conveyers which have a cylindrical retaining ring which is placed into the cylinder pipe and then welded together with it on the front sides. Such hub constructions result in difficulties when they must be set into cylinder pipes whose inner diameters have great dimensional variations. This can be traced back to the fact that in the manufacturing process of pipes one always begins from a greater diameter and then reduces it to a standardized outer diameter by means of a calibrating tool or drawing die, whereby the inner diameter does not have a dimensional size which can be defined precisely. But in the case of a pipe not reduced, differing or irregular inner diameters also result from the tolerance of the thickness of the plate.

There are other known possibilities for juncture aside from the welding of roller bases with the roller cylinder, for example, the flanging or production of a press-fit connection. Because of the irregular inner diameter of the cylinders and/or because of the sometimes inexact mounting of the hubs in flanging or welding, it is necessary in all kinds of junctures between the bearing pulley cylinder and the roller base or hub to stretch the bearing pulley on a register machine after completion of the juncture in order to produce the centricity of the axle end.

Another important disadvantage with the known methods, for example in butt-welding, is that the outside diameter of the cylindrical pipe in the area of the juncture must always be considered and reworked.

It is the purpose of the invention to provide a bearing pulley for conveyor belts and gravity roller conveyers which, in contrast to the known weld and flange constructions, can be manufactured in a far reaching automatic fabrication as a one-piece construction unit and for which the axes of the bearing pulley require no further balancing.

This task is solved by the present invention according to a method whereby proceeding from a cylindrical pipe which forms the bearing pulley, the pipe ends are reduced in truncated cone form in successive steps in given cases with varying tapered augmentations, down to a diameter corresponding to the roller pin, or to a diameter permitting attachment of a roller pin, and the tapered part is then pushed into inverted position concentrically a given distance into the cylindrical pipe that its end is brought near the end of the roller cylinder up to the axial interval desired.

Preferably the conically tapered parts can be connected to cylindrical or multiangular central parts which serve as supports and as anchoring surfaces for gear wheels, chain wheels and other driving mechanisms.

An important advantage of the invention results from the fact that the entire production, economical in time, place, and equipment, occurs only in non-cutting profiling and the centricity of the taper as well as of the position of the bearing pulley pin relative to the bearing pulley diameter is automatically assured during the reduction process.

The method can be used with commercially welded pipes or with seamless pipes. Any suitable material can be used for the bearing pulleys, preferably steel but also aluminum or plastic.

A further advantage of the invention is that with greater cylinder wall thicknesses, and with thereby a smaller conical diameter reduction relative to the axial length, a bearing pulley is still obtained with as short a total length as possible because the long conical part can be placed in inverted position sufficiently deep without difficulty. With a common normal steel for bearing pulleys, a gradual reduction of the pipe diameter is achieved in magnitudes up to 60% and 65% above the cold deformation with the use of the method according to the present invention. Often this degree of deformation suffices to tip-stretch the roller pin. If the cord deformation limit is reached earlier, for example if a pipe with greater diameter requires a small pivot pin because of a smaller load, the production part must then be annealed intermediately. In order to avoid this inconvenient step because of the installation and time expenditure, it is proposed according to the present invention that an extension piece consisting preferably of the pipe material be welded onto the end of the conically reduced cylinder pipe and then, in a given case, after further reduction of the welded part down to the required pin diameter, the tapered part is placed in inverted position centrally at the desired length into the cylinder pipe. The extension part can be welded into the opening at the reduced pipe end or it can be welded directly onto the outer side of the pipe end.

This suggestion makes it possible to join the roller pin directly without providing a roller base or hub whose use requires additional work and which would increase the axial length of the bearing pulley and the overall construction width of the roller conveyer.

Likewise, a variation within the scope of the invention contemplates the conical part between the outer pin diameter and the reduced pin diameter being left in conical form (not placed in inverted position), and then an outer cylinder pipe being inserted and secured on the bilaterally tapered cylinder, whereby the outer cylinder pipe has a total length which is shorter in the required measurement than the interval length between both tipstretched roller pins.

It is further proposed according to the invention to fill the interior space of the bearing pulley cylinder with a synthetic foam material in order to reinforce the thin-walled cylinder and/or achieve noise reduction.

The present invention relates to a method for producing a bearing pulley for conveyer belts and roller gravity conveyers in which the bearing pulley has a cylinder component part and common central pivot pins which are secured by a hub or roller base to the cylindrical component part. The method comprises proceeding from a cylindrical pipe forming the bearing pulley, tapering the ends of said cylindrical pipe in a truncated form by non-cutting cold deformation down to a diameter corresponding to or approaching the pivot pins, and subsequently inverting the tapered end portions centrally such that their conical areas are disposed within the cylindrical portion of the cylinder component part a sufficient distance to provide the desired spacing between the ends of the resultant bearing pulley.

The bearing pulley according to the present invention comprises a cylindrical section and bilateral roller pins which are joined with the cylindrical section across a roller base, characterized in that the roller base comprises a conically reduced portion and the tip-stretched end inverted into the cylindrical section interior, said tip-stretched end bearing the roller pin.

The invention is explained in greater detail below with the aid of exemplary modifications shown in the drawings.

FIG. 3 is a view in partial section of another modification;

FIG. 3a is a end view to illustrate the bearing pulley mounting; and

Figure 1:
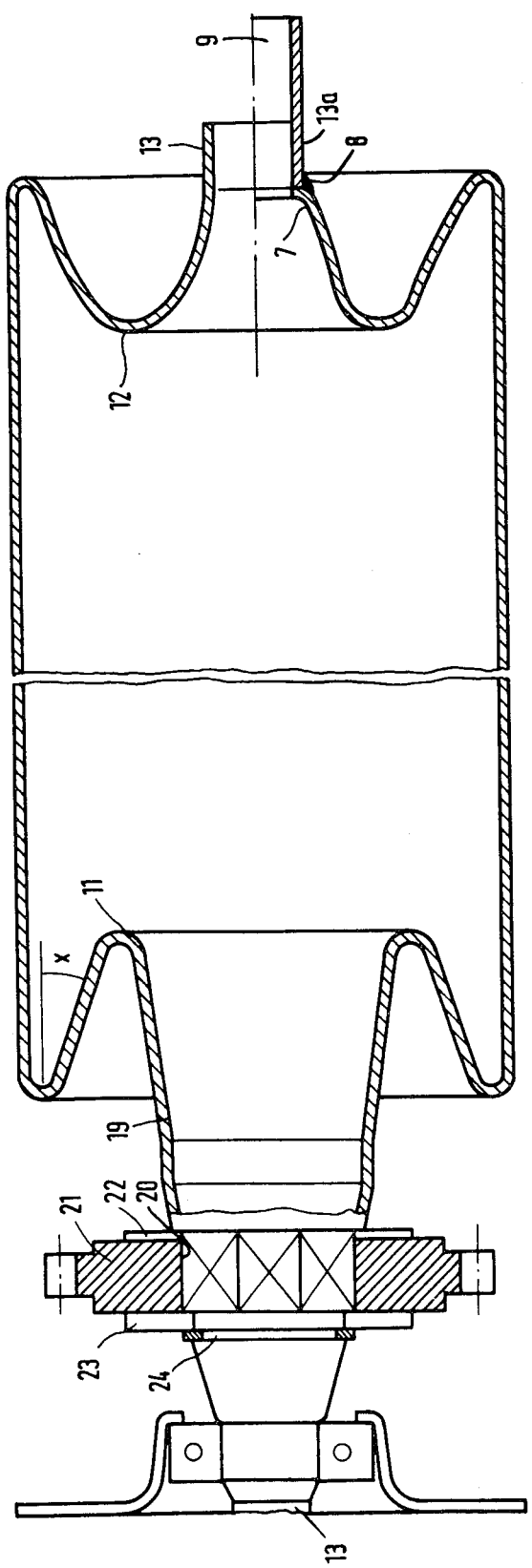
FIGS. 1 and 2 are schematic longitudinal cross-sections through bearing pulleys with different forms of roller pins according to the present invention.
Figure 2:
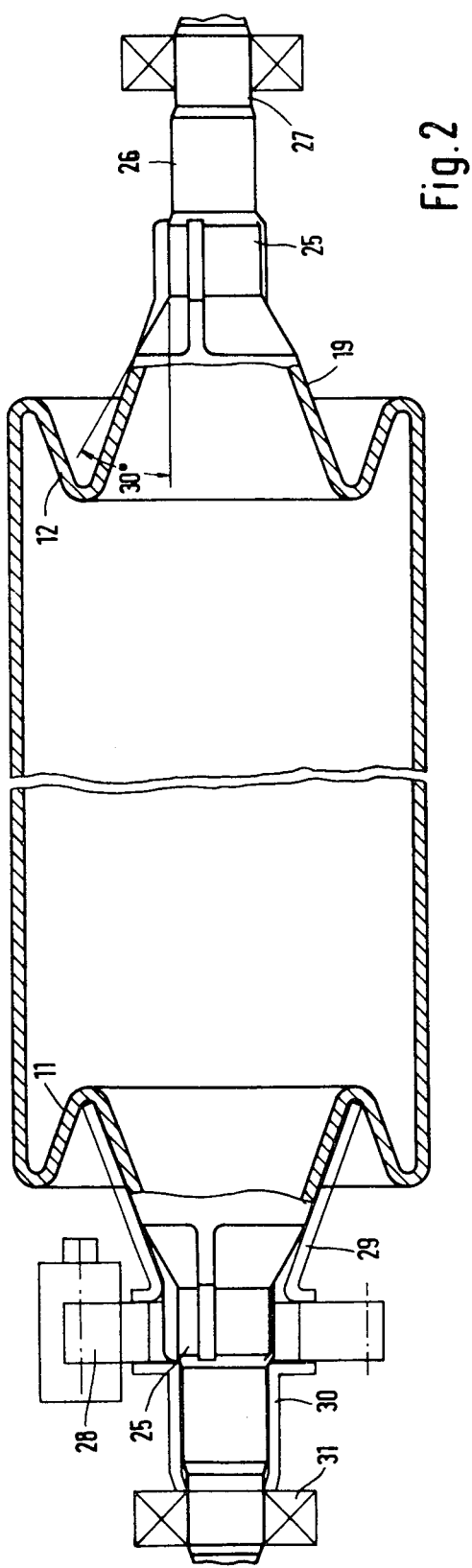

With reference to FIGS. 1 and 2, the hubs or roller bases 11, 12 for a bearing pulley 10 extend from a cylindrical material and are conically reduced without cutting to the smaller diameter of pivot pin 13. These kinds of compression of reduction procedures are well known and belong to the subject of the present invention only to the extent of their specific application.

Figure 4:
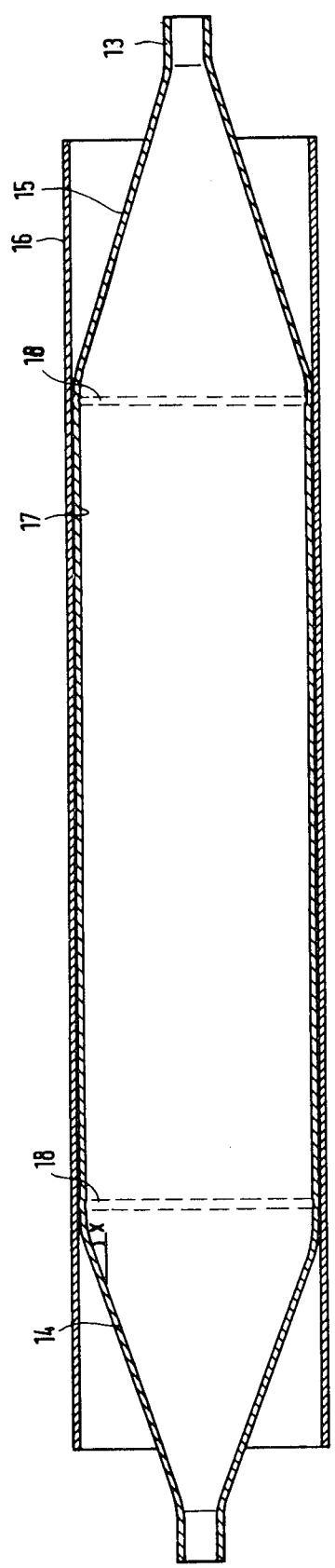
FIG. 4 is a longitudinal sectional view of a further exemplary modification of the invention.

The conically tapered portions 14, 15 which are first produced through a reduction procedure, are clearly recognized with the bearing pulley according to FIG. 4. In this exemplary modification, the required length of the bearing pulley is achieved by a simple cylindrical pipe 16, which is pushed over the inner cylinder 17 and secured there. In order to join cylinders 16 and 17 to each other, a rigid slide fit, or if necessary, bonding or a small expansion or compression 18 of the inner cylinder, can be employed on the outermost end of the cylindrical portion.

As shown in FIG. 4, the bearing pulley may be of a small pipe wall thickness in order to minimize the bending under load through the double cylinder 16, 17. On the other hand, the type bearing pulley shown in FIG. 4 can be useful if the conical portions 14, 15 have only a small angle of opening of about 15° in the situation where the cylinder 17 has a very great wall strength or if the material has poor rheological properties. The pivot pins are tip-stretched on the ends of the portions 14, 15 which can also be formed as races for roller bearings.

The conical portions 14, 15 of the bearing pulley form, according to FIG. 4 in the examples according to FIGS. 1, 2, and 3, the inverted roller bases or hubs 11, 12. The angle X of the taper can be 30°. Whereas the pivot pin 13 can project only so far axially over the end plane of the bearing pulley as is necessary for mounting in the bearing of a roller conveyer, the opposite side has, for example, a longer tapered part 19 with a smaller angle of opening on which a part 20, preferably shaped to a polygon cross-section, can be provided between the pivot pin 13 and the roller end to connect with a chain wheel or gear wheel 21.

If necessary, several thus shaped cross sections 20 can be formed on the extended cone piece 19 in order to provide additional gear wheels or other elements to be joined with the bearing pulley 10. The adjustment and securing of the gear wheel 21 may be achieved, for example, by means of a ring 22, a spring washer 23 lying opposite, and a spring ring inserted in a supplementary groove 24.

The profiled cross-section 20 of the tapered pin portion 19 protruding from the bearing pulley can also correspond to the hub opening of a spherical or roller locking gear operating with ball bearings or rollers, if the bearing pulley is driven in only one direction of rotation or is intended to revolve in only this one direction of rotation. Similar measures can be applied in the area of the bearing pulley 13 if the bearing is already equipped with a by-pass opening. In this connection FIG. 2 illustrates a bearing pulley 10 with a tip-stretched profile 25 similar to a key shaft, and graduated cylinder parts 26, 27 connected to it.

A chain wheel 28 is secured axially on the key shaft with the aid of spacers 29, 30. The spacers reinforce themselves with the aid of bends on the chain wheel and are secured to the conical portion 19 or to the roller bearing inner ring 31.

On the right side in FIG. 1, the lower half of a roller pin 13a is shown as a further variation; it is secured by means of a weld 8 on the reduced end 7 and subsequently inverted. The extension 9 of the roller pin 13a indicates that here, if necessary, the diameter could be reduced still further by the same method.

In FIG. 3 the pivot pins 33 of the bearing pulley have been formed directly as races for the ball race or roller race of a roller bearing 34. The outer ring bearing of the roller bearing is formed by a correspondingly-formed tin plate 35 which covers the inverted hub part 11 or 12 toward the outside and according to FIG. 3a is inserted from above, behind cover plates or projections or tabs 36, which are tip-stretched on the frame 37 of the roller conveyer or as the tabs are punched out.

In this way, the plates 35 can easily be lifted upwards out of the cover plates 36 for the assembly and disassembly of the bearing pulley.

On the right side in FIG. 3, the bearing pulley 10 has a peripheral groove 38 produced by a non-cutting deformation which accommodates a driving belt 39. In addition, the hollow interior 40 may be foam filled to increase its strength and noise reduction properties so that relatively thin material can be used for the bearing pulley 10.

In basic terms, the invention contemplates a method of manufacturing bearing pulleys for conveyer belts and gravity-roller conveyers comprising: proceeding from a given roller cylinder diameter, through non-cutting deformation reducing the cylinder ends to an automatically centered smaller diameter, preferably that of the pivot pin, producing thereby an inexpensive integrally tip-stretched roller base with the outer surface of the bearing pulley unaffected, and wherein an arbitrary definable, but optimally small over-all length can thereby be maintained. The tolerances of the raw materials are not increased with this procedure, and in addition, the circumferential accuracy is guaranteed by the automatically centering deformation instrument.

The invention likewise involves the following method for the manufacture of bearing pulleys of the kind described above proceeding from the knowm method of conical reduction of a cylinder pipe to a small diameter through cold deformation, it is proposed according to the present invention that, on the reduced end, a roller pin be tip-stretched in a cylindrical shape or alternatively, a cylindrical pipe part be welded onto the tapered end in case the cold deformation capacity of the pipe material is exhausted in the conical region.

The cylindrical roller pin at the end of the conical part is grasped and with this the conical piece inverted into the cylinder pipe until the roller pin is located at a desired interval from the end of the bearing pulley. With the aid of a cold molded radial groove or notch impressed into the cone, the inversion procedure in a serial production can be compared and the deformation procedure in inversion can be facilitated.

What is claimed is:

1. A method of producing bearing pulleys for conveyer belts and roller gravity conveyers in which the bearing pulley includes a cylindrical portion and common central pivot pins secured to the cylindrical portion by a hub or roller base, said method comprising:
   providing a cylindrical pipe of a desired bearing pulley diameter,
   tapering the end portions of said pipe in a truncated configuration by non-cutting cold deformation down to the diameter of the pivot pins, and
   subsequently inverting the tapered end portions of said pipe centrally within the cylindrical portion of said pipe a distance sufficient to provide the desired spacing between the ends of said pipe.

2. The method of claim 1 wherein the said tapering and inverting steps occur in a single working operation without intermediate annealing.

3. The method of claim 1 wherein the necessary reduction of the end pipe portions from the bearing pulley diameter to the pivot pin diameter exceeds the cold deformation capacity of the pipe material, characterized in that a pipe piece with a diameter smaller than said bearing pully diameter is welded to one of said tapered end portions, said welded pipe piece is reduced in diameter, and said tapered end portions and said welded pipe piece are together inverted to the extent desired.

4. The method of claim 3 characterized in that said welded pipe piece is a prefabricated bearing pulley pin.

5. The method of claim 1 and wherein said tapering of the end portion is achieved in successive steps.

6. The method of claim 1 wherein:
   said pipe is reduced conically by means of a reducing ring through cold deformation to a smaller diameter,
   an annular groove is non-cuttingly formed in said tapered end portions before the step of inverting, in order to facilitate the inversion.

7. The method of claim 6 and wherein:
   the said inverting forms a concave cone, and
   said annular groove is located at the base of said concave cone.

8. A method of producing a bearing pulley for conveyer belts and roller gravity conveyers in which the bearing pulley has a cylinder component part and common central pivot pins which are secured by a hub or roller base to the cylindrical component part, said method comprising:
   proceeding from a cylindrical pipe forming the bearing pulley, tapering the ends of said cylindrical pipe in a truncated form by non-cutting cold deformation down to a diameter corresponding to or approaching the pivot pins, and
   subsequently inverting the tapered end portions centrally such that their conical areas are disposed within the cylindrical portion of the cylinder component part a sufficient distance to provide the desired spacing between the ends of the resultant bearing pulley.

* * * * *